May 30, 1933.　　　T. C. THOMSEN　　　1,911,655
TIRE TOOL
Filed June 20, 1932
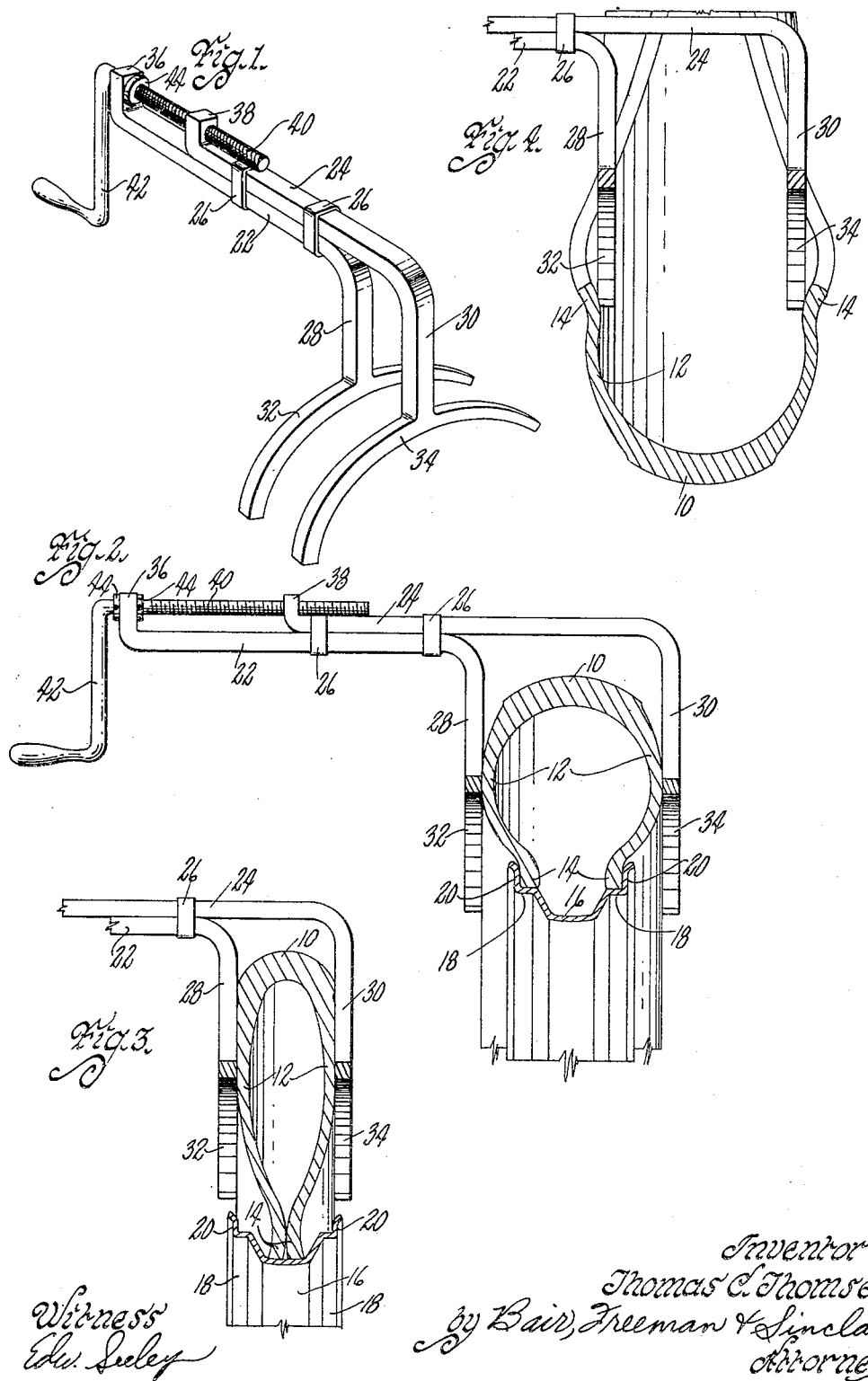
Inventor
Thomas C. Thomsen
by Bair, Freeman & Sinclair
Attorneys
Witness
Edw. Seeley Patented May 30, 1933

1,911,655

UNITED STATES PATENT OFFICE

THOMAS C. THOMSEN, OF IRWIN, IOWA

TIRE TOOL

Application filed June 20, 1932. Serial No. 618,093.

The object of this invention is to provide an improved construction for a tool designed to facilitate the handling of tires, particularly in the operation of applying them to and removing them from rims.

A further object of the invention is to provide an improved tire tool having a pair of relatively movable curved arms adapted to engage the opposite sides of a tire so that the tire may be compressed and the beads brought into close proximity, thereby facilitating the operation of removing and applying the tire.

Still another object of the invention is to provide an improved tire tool which may be employed not only for applying pressure to compress the sides of a tire but may also be used for expanding a tire and holding the side walls apart while the interior of the tire is being cleaned and repaired.

Another object of the invention is to provide a tool of the class described which is simple, durable, economical and easy to operate.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:—

Figure 1 is a perspective view of a tire tool embodying my invention.

Figure 2 is a side elevation, partly in section, showing the tool applied to a tire mounted on a rim and in position for compressing the tire to facilitate the operation of removing it from the rim.

Figure 3 is a similar view showing the tool in operation,—compressing the tire and holding the side walls and beads together preliminary to removal from the rim.

Figure 4 is a sectional elevation showing a portion of the tool in position for use in connection with a detached tire for holding the side walls of the tire spread apart.

The tool forming the subject matter of my invention is designed particularly for use in connection with tires which are used on what are known as "drop center" rims. These tires and rims are of well known construction and are here shown more or less conventionally. The tire includes a tread portion 10 and spaced side walls 12 terminating in beads 14. The rim includes a central channel shaped portion 16 bounded on opposite sides by outwardly extending shoulders 18 which terminate in radially disposed flanges 20 between which the beads 14 of the tire are confined, with their radially inner edges resting on the shoulders 18.

It is quite a difficult task to apply or remove a tire relative to a rim of this type but my present tool facilitates this operation by providing a convenient means for compressing the side walls 12 and beads and holding them in compressed relation, at one side of the tire, while it is being removed from or applied to the rim.

The tool comprises a pair of bars 22 and 24, one of which is superposed on the other and arranged for sliding movement relative thereto. The bars 22 and 24 are held in sliding relation to each other by means of loops 26 fixed to and embracing one of the bars and embracing the other to permit sliding movement of such other bar therein.

The bars 22 and 24 are formed at their outer ends with right angled extensions 28 and 30 respectively and at the ends of these extensions are mounted curved tire engaging arms 32 and 34 respectively. The curved arms 32 and 34 are arranged transversely relative to the bars 22 and 24, in parallel relation to each other, and are curved on arcs to conform in a general way to the circumferential curvature of a tire. The extensions 28 and 30 are formed on or fixed to central portions of the curved arms 32 and 34 and on the outside edge thereof with respect to the arcs on which the arms are formed.

At their opposite ends the bars 22 and 24 are formed with outturned or upturned lugs 36 and 38 respectively, these lugs being relatively short and projecting in the opposite direction from the bars with respect to the projections 28 and 30.

The lug 38 of the sliding bar 24 is interiorly threaded to receive a screw threaded shaft 40 and the lug 36 of the other bar 22 is provided with a plain bearing for said shaft, which shaft is formed on its outer end with a crank 42. Collars 44 are mounted on the shaft 40 on opposite sides of the bearing lug 36 to prevent longitudinal movement of the shaft therein.

It will be obvious that by turning the crank 42 in one direction the bar 24 will be caused to slide in one direction on the bar 22, because of the threaded engagement of the shaft 40 with the lug 38 on said bar, and that an opposite rotation of the shaft will cause said bar to slide in the other direction. In this manner the curved arms 32 and 34 may be caused to move toward or away from each other and they will at all times be held firmly in the relative positions in which they are placed.

When it is desired to remove a tire from a rim the tool is first manipulated so as to space the arms 32 and 34 apart a sufficient distance that they may engage the outer faces of the side walls 12 of the tire as indicated in Figure 2.

Then the crank 42 is turned for rotating the shaft 40 in such direction that the lug 38 will be moved toward the lug 36, thereby sliding the bar 24 inwardly on the bar 22 and causing the arm 34 to be moved toward the arm 32. As this movement is continued the tire will be compressed by moving its side walls toward each other, it being understood that the tire is in deflated condition. This compression of the tire also moves the beads 14 toward each other and out of engagement with the flanges 20 of the rim. When the tire is so compressed and held in compressed condition, it is much easier to remove the tire from the rim by causing the radially inner edges of the beads 14 to slide over the radially outer edge of one of the flanges 20. It will be noted that the arms 32 and 34 are of considerable extent and engage considerable portions of the side walls of the tire so that it is compressed throughout a material part of its circumference.

A reversal of this operation is employed for applying a tire to the rim. The side walls of the tire are first engaged by the arms 32 and 34 and compressed in the same manner as above described. Then the portion of the tire diametrically opposite to the tool is caused to engage the rim and thereafter the compressed portion is forced over one flange of the rim and then the tool is removed.

The operation of applying or removing the tire may readily be carried out while the rim and tire are lying practically flat on a floor or bench.

Another use to which this tool may be put is illustrated in Figure 4. Oftentimes it is desirable to spread the side walls of a tire apart to facilitate the operation of cleaning and repairing the interior. In such event the arms 32 and 34 may be placed into substantial engagement with the inner surfaces of the side walls 12 and then moved apart by turning the crank 42. In this way the side walls are spread apart and the tire is held in open position for a considerable part of its circumferential extent, thus giving access to the interior of the tire.

Some changes may be made in the construction and arrangement of the parts of my device without departing from the real spirit and purpose of my invention, and it is my intention to cover by my claim, any modified forms of structure or use of mechanical equivalents, which may be reasonably included within their scope.

I claim as my invention:—

A tire tool comprising a pair of bars arranged for relative sliding movement, said bars being formed at one end with right-angled extensions lying in the same plane longitudinally of said bars, parallel arms on said extensions adapted to engage opposite side walls of a tire, said arms being arranged transversely relative to the plane of the extensions and bars and being curved longitudinally, a bearing at the opposite end of one of said bars, a crank shaft rotatably engaging said bearing, said shaft having a screw-threaded portion, and a threaded lug on the other bar engaged by the threaded portion of the shaft, whereby the bars may be slid and the arms moved toward or away from each other by rotating said shaft.

THOMAS C. THOMSEN.